Inventor
James Schenck
By Mason, Fenwick & Lawrence
ATTORNEYS

May 11, 1954 J. SCHENCK 2,678,254
CODING AND RECORDING SYSTEM
Filed Dec. 16, 1949 3 Sheets-Sheet 2

Inventor
James Schenck
By Mason, Fenwick & Lawrence
ATTORNEYS

CODING AND RECORDING SYSTEM

INVENTOR
James Schenck
By Mason, Fenwick & Lawrence
ATTORNEYS

Patented May 11, 1954 2,678,254

UNITED STATES PATENT OFFICE 2,678,254

CODING AND RECORDING SYSTEM

James Schenck, Oak Ridge, Tenn.

Application December 16, 1949, Serial No. 133,255

13 Claims. (Cl. 346—33)

This invention relates to a method and improved apparatus for translating one or more single valued functions of time into discrete representations in the form of electrical quantities. These discrete electrical quantities can be utilized to effect corresponding discrete representations on a recording medium or can be used directly to operate receiving apparatus which can reconstruct the time function. It will necessarily follow that a record containing these discrete representations can also be used to operate suitable conversion apparatus for the purpose of reconstructing the original time function. One of the primary phases of the invention resides in the provision of the novel method of recording time functions and in the novel record, per se. Another aspect of the invention resides in the provision of a novel coder circuit which can be used in recording or in the direct transmission of intelligence, or any other time function.

For the purpose of brevity, the term signal is used hereinafter to denote any single valued function of time. Typical signals which may be recorded by the present method and/or transmitted by the apparatus are complex wave forms such as those encountered in speech, music, sounds, mechanical vibrations, and video signals including television and facsimile transmission. Other examples of typical signals are the time responses of electrical measuring instruments such as microphones, tachometers, and the like.

Heretofore most types of recording systems have been subject to the disadvantage of distortion and noise associated with the recording and reproducing process and also subject to noise and distortion which is inherent in the record medium. Non-linearities and irregularities in the record materials and in the recording and reproducing transducers generate a characteristic distortion and noise which is superimposed on and in many cases is inseparable from the signal. The fact that in general these distortions are large for large amplitude signals, and that the signal-to-noise ratio is relatively low for small amplitude signals, determines a usually severe limitation of the amplitude range of the recording. Another common objection to most types of recording systems using film, tape, or wire, is that the signal is recorded on the medium in such a way that the time axis of the record corresponds to a single axis along the record in its direction of movement. This requires that the record material move sufficiently fast with respect to the recording or reproducing transducers so that the fastest variation in the amplitude is distinguishable. This entails the use of considerable length of record material and adds to the cost and inconvenience of recording and reproduction.

Accordingly, the primary object of the present invention is to provide a novel recording method and apparatus which overcomes the above named disadvantages and provides very faithful and low-noise reproduction.

Another object is to provide such a novel recording method and apparatus in which optimum utilization of recording medium area is afforded and where the record can be run at a relatively low speed.

Another object is to provide a novel recording method in which the signal is translated into discrete representations in the form of electrical quantities corresponding to the values of the signals at discrete points on the time axis, discrete representations of the electrical quantities being recorded on a recording medium.

Another object is to provide a novel method of recording a signal in which an instantaneous amplitude of the signal is translated into discrete representations in the form of a code group of electrical quantities which are utilized to effect corresponding discrete representations on, or in, a recording medium.

Another object is to provide a novel record of a signal in the form of discrete representations of code groups which correspond to the instantaneous values of amplitude of the signal.

Another object is to provide a novel record of intelligence in the form of discrete representations of components of the intelligence signal expressed in a positional number system and particularly in a binary number system where the discrete representations correspond to the values of the digits of numbers and which, by their presence or absence, can be translated into electrical quantities indicating a digit of unit or zero value, respectively.

Another object is to translate a series of discrete representations corresponding to the amplitude of a complex wave at a given instant of time into a discrete representation in the form of an electrical quantity having a value which is a function of the amplitude of the original complex wave at the corresponding instant of time.

Another object is to provide an improved method and system for the rapid representation of the instantaneous amplitude of complex waves by permutation code groups of pulses in an improved and simplified manner.

Another object is to provide an improved system for rapidly and continuously translating a signal into discrete permutation code groups of electrical impulses representing instantaneous values of the signal, the electrical impulses being utilizable in reconversion apparatus in such a manner that the reconversion apparatus will reconstruct faithfully the original signal.

A still further object is to provide an improved coder in which an amplitude comparator element is used to initiate generation of code pulses and in which the amplitude comparator element operates in cooperation with a substracting element, an amplifying element, a delay element, and sequence control elements in order to repeatedly transform and circulate a sample of the signal through the amplitude comparator element for the purpose of generating an arbitrary number of code pulses representing the amplitude of the signal sample.

Another object is to provide a novel method of recording a function of time in which, instead of attempting to produce a record of all the values of the function, a plurality of discrete instantaneous values of the function are translated into permutation code groups on the recording medium in such a way as to realize efficient utilization of the area of the recording medium while obtaining optimum fidelity of reproduction and reduced speed of travel of the medium, within the limits of the resolving power of the medium.

A still further object is to provide such a novel system of recording described immediately above, in which a plurality of signals may be simultaneously recorded or reproduced while maintaining substantially the original time and phase relationship between the signals.

An important specific object of the present invention is to provide means of recording a signal in such a way that upon reproduction the record moves relatively very slowly past the reproducing transducer as compared to the speeds of the records in common methods of reproduction, by recording the signal along segments which are aligned in a direction substantially perpendicular to the direction of record travel, the signal track being interrupted at the end of each segment and continued on the adjacent segment.

By way of illustration it is helpful to make a comparison as an example between the variable width method of sound recording on film and one simplified version of the code system in accordance with the present invention in which a single code group is impressed along a line perpendicular to the direction of travel of the film. This code group will represent the amplitude value of the original signal at a certain instant of time. The amplitude of the signal at succeeding instants of time will be represented by succeeding code groups arranged in lines parallel to the first and also perpendicular to the direction of the recording medium. It is evident that the minimum width of this track will depend upon the resolution of the recording medium and the number of codes chosen to make up the code group.

In the case of variable width sound-on-film recording, the instantaneous width of the sound track is a proportional measure of the instantaneous amplitude of the signal. The maximum width of the track will correspond to the maximum amplitude of the signal, and the minimum amount of film which must be made available for the sound track will be set by the resolution of the film and the amplitude range and fidelity requirements of the signal. Because of the limit of resolution and the granularity of the film, there will be a certain limit on the smallest detectable increment of signal amplitude. The width of the track must therefore be sufficient to indicate as many of these smallest increments of signal amplitude as are necessary to give a predetermined fidelity of reproduction of the entire amplitude range of the original signal.

In the case of the code method, the width of the track is constant, since it consists of a code group of a fixed number of permutation codes. Since the number of permutation codes which are required is determined by the number of the different smallest detectable increments of signal amplitude, the minimum width of film which must be made available for the code sound track, just as for the variable width method, will be set by the amplitude range and fidelity requirements of the original signal. There is, however, an important difference between these two methods as described. Whereas in the variable width method it would be necessary to double the width of the sound track in order to double the amplitude range of the recorded signal, in the code method it is merely necessary to add one more code to the permutation codes of the code groups. In other words, if the amplitude range of the signal indicated the use of, say, ten codes per code group, this amplitude range could be doubled through the use of one more, or eleven, codes per code group; at the cost of only ten per cent increase in track width. One might verify this fact by thinking of the code group as a binary number. Let $n$ be the number of codes per code group. Then the maximum number of representable amplitude values equals $2^n$. If we add one more code, we would write $2^{n+1}$. But $2^{n+1}=2^n\times2$, or twice as many amplitude values.

So far this comparison has been concerned only with the single dimension of track width. In order to have criteria for the comparison of the two methods with respect to a given amount of film area, it is necessary also to consider the question of track length. In regard to the variable width method, it will be helpful to consider the sound track as being composed of a large number of elements of area. Let such elements be parallel bars arranged side-by-side, separated from one another by a distance equal to the width of the bar, and having a direction perpendicular to the direction of track travel. The maximum number of bars per unit track length will be obtained by letting the distance between adjacent bars equal the resolving power of the film.

It is now possible to determine a relationship, with respect to film economy, between the variable width method and the code method; because a code group may be though of as an elementary bar of codes whose length is determined by the number of codes per code group and whose minimum separation is equal to the resolving power of the film.

Therefore, the only other point that need be considered is the respective number of elementary lines so arranged in a sound track for a given recording or reproducing time, or "playing time," for the variable width sound track and for the code sound track. It can be shown that this number is the same for both methods.

It is evident, then, that these two methods so compared are essentially alike in respect to film economy, except that a greater amplitude range may be secured in the code method because a signal amplitude is indicated not by the length of an elementary line, but by the permutation of points, or codes, within an elementary line.

The important feature of the code method in regard to film economy is the ease with which such a method is adaptable to the arrangement of a plurality of code-groups along a line of length much greater than the width of an ordinary sound track and thereby achieve the most efficient use of an area of recording medium of almost arbitrary dimensions. Thus the record width here is not limited to the usual small dimension of the sound track width. The record may be many times wider, consequently requiring a much shorter length of record. A particular aspect of the invention may be considered as the solution of the problem of recording sound on the conventional 35 mm. film while at the same time making the most efficient use of every square millimeter of the film. A different way of saying this is that the invention contains a solution of the problem of widening the "sound track" in order to achieve a proportionate reduction in the length of the track.

Briefly, in accordance with the present invention a method and apparatus are provided for generating control pulses of a predetermined time relation with respect to each other and for rapidly sampling or measuring a finite number of discrete points on a complex wave at predetermined recurring time intervals. The control pulses control a novel coder circuit which circulates the predetermined number of successive pulses of a magnitude dependent upon the value of the wave at the discrete points.

Although it is within the contemplation of the present invention to use a positional number system to any desired base, preferbly the invention contemplates a system in which the amplitude of the complex wave function may be expressed or represented by a binary number which lends itself to a system in which the individual digits in the positional system may be represented by a unit value or a zero value. In other words, the presence or absence of a code element at a point with respect to other elements of the code will represent a definite value. Consequently, the receiver or conversion apparatus need only be capable of distinguishing between two signal conditions to permit faithful transmission or reproduction of the complex wave. In this way a low signal-to-noise ratio can be anticipated in the recording and reproduction process so long as the presence of the quantities representing the unit values of the binary code is distinguishable.

It will be readily apparent to those skilled in the art that the system used herein may be utilized to transmit intelligence from a transmitter terminal element to a receiver or other reconversion terminal apparatus directly, or alternatively, the permutation code group can be used to operate reconversion apparatus.

Specifically, the invention contemplates a novel recording and reproducing system which carries out the following steps: first, the signal is sampled by measuring its amplitude value at recurring time intervals; secondly, these amplitude values are transformed into code groups of a chosen number of codes, which code groups represent the amplitude of the samples in terms of binary numbers where each code represents the value of a different digit (this method being commonly known as binary coding); thirdly, groups of code groups, each code group representing a particular sample, are recorded in time sequence transversely of a film, or some other recording medium, along parallel lines which are perpendicular to the direction of travel of the recording medium. For example, if 10 codes are chosen to represent every sample, and it is desired to record 10 consecutive samples along a single line transversely of the film, then this line would consist of 100 codes (or dots), presence or absence of a discrete representation of a code being determinative of value. When many samples of the signal are taken, they are printed sequentially in a like manner along adjacent parallel lines transversely of the film. Since a system of on-off recording is provided, minor variations of the exact positioning of the dots and density representing codes have no influence whatsoever on the accuracy or faithfulness of reproduction.

Let it be understood that the description in the preceding paragraph is made simple and specific for the sake of illustration, and that many variations are possible within the spirit and scope of this invention. For example, it is not essential that the code groups be printed along straight parallel lines. What is essential is that the code groups be recorded according to an arrangement which makes efficient use of the total area of a recording medium. Means may be provided whereby code groups are arranged along adjacent arcs whose tangents at the midpoints are substantially perpendicular to the direction of film travel. It should also be understood that the plurality of codes in each code group which represents an amplitude value of a sample of the signal may depend upon a positional number system of a base other than two. What is essential is that, having chosen to represent successive amplitudes of signal samples in accordance with a positional number system expressible in the form $A_nB^n+A_{n-1}B^{n-1}+A_{n-2}B^{n-2}+ \ldots +A_0B^0$ that the coefficients of this series be recorded in a manner which is substantially independent of the linearity or precise operation of the recording process. The binary number system is immediately adaptable to such a scheme since each of the coefficients $A_n$ to $A_0$ have only two possible values, and these values may be represented as the presence or absence of, say, the blackening of a small area of film at a position on the film so determined as to correspond to a particular coefficient.

In order that a clearer understanding of the operation of the present invention may be had, the instant coder circuit will first be described in terms of three elements representing the principal operating components of the detail coder circuit to be later described. These three components comprise a switch, an operator device, and a delay device, the switch and the operator being connected in series between input and output terminals; the input signal being designated S, the signal coupled between the switch and the operator being designated B. and the output being designated G. An additional output signal from the operator, designated D, is coupled back into the input to the switch through the delay, the delayed output being designated R. The wave form S, at the input, is a train of pulses whose amplitudes are corresponding measures of the amplitude of the signal to be coded. The wave form G, at the output of the coder, is a train of rectangular pulses each pulse of which is a code, or code element. The amplitudes of these rectangular pulses, or codes, of the wave form G have only two possible values. One of these two values is equal to zero, the other value (call it V) being whatever is suitable for the purpose of recording or transmission. For each pulse of the wave form S there is generated a group of $n$ consecutive rectangular pulses, called a code group. The amplitude of each pulse of the code group may be either 0 or V. The coder, then, is a device which transforms "pulse amplitude" into "pulse code."

The means of operation of the present novel coder device may be understood by considering the transformation in the coder of one particular pulse of the waveform S into corresponding train of $n$ pulses of the waveform G. This transformation may be most simply worked out in terms of the three cooperating elements: Switch, Operator, and Delay. First it is necessary to explain the operation of each element separately.

The Switch connects S to B at the correct time and just long enough for the pulse under consideration to get to the operator. After the Switch has performed this function it disconnects from S and connects R to B. The Switch circuit is sometimes called a "gate" circuit, since it opens or closes gates from S to B and R to B in some predetermined sequence.

The Operator performs according to the following simple formula:

$$B \leq K2^{n-1},\ G=0,\ D=2B;$$
$$B > K2^{n-1},\ G=V,\ D=2(B-K2^{n-1})$$

where $$K=S(\max)/2^n;\ n=1, 2, 3, 4 \ldots$$

From this formula can be determined the amplitude of the pulse which the Operator puts out at G and D for any given pulse at B. All the pulses at S, B, G and D during an operation are considered to occur simultaneously. The purpose of the Delay is to delay the pulse at D while these pulses are being generated. After the delay time the pulse at D appears at R and is gated through the Switch to B where the Operator repeats exactly the same function. As each pulse of S is admitted to B it is circulated around the loop B—D—R for $n-1$ times, being transformed by the Operator and generating a pulse of amplitude either 0 or V at G for the first pulse of S and for each circuit thereafter.

As a simple example: let $n=4$. Therefore $2^n=16$ and $2^{n-1}=8$. Suppose $S(\max)=16$, then $K=1$. Substituting these numbers in the above formula governing the performance of the Operator, we find that for $$B \leq 8,\ G=0,\ D=2B;\ \text{and for}$$
$$B>8,\ G=V,\ D=2(B-8)$$

Now suppose a pulse of amplitude 6.5 comes in on S and is admitted to B. We say that $B=6.5$. But 6.5 is less than 8, so $G=0$, and $D=2$ times $B$ or 13. This pulse at D of amplitude 13 is delayed, then appears at R where it is switched to B. We now say that $B=13$. But 13 is greater than 8 so $G=V$, and $D=2$ times the quantity 13—8 or 2 times 5 or 10. Now $B=10$, but $10>8$, so $G=V$, and $D=2(10-8)=4$. Now $B=4<8$, so $G=0$.

Now write down the sequence of the four values of the output pulses at G corresponding to the input pulse of amplitude 6.5. These were 0, V, V, 0. The expression for a binary number of four places, or $n=4$, is $$A_3 2^3 + A_2 2^2 + A_1 2^1 + A_0 2^0$$

Letting $V=1$ in the sequence of values for G we have the sequence 0, 1, 1, 0. These are the values of the coefficients in the expression for the binary number where $$A_3=0,\ A_2=1,\ A_1=1,\ A_0=0$$

Consequently, the number generated by the coder for a pulse of amplitude 6.5 is $$0\times2^3+1\times2^2+1\times2^1+0\times2^0=6,$$

which is a measure of the amplitude of the pulse under consideration within the nearest whole number.

An important feature of the present invention consists of sampling and coding of a signal to achieve accurately and precisely the recording of a signal on an area of recording substance rather than along a line in the direction of record travel, the code representation of the signal being of such a nature that it may be disposed over the entire area of the recording medium without interfering with other intelligence that may be therein. The process of sampling renders itself uniquely to the division of the sampled signal in such a way that the signal can be divided and placed at determined positions on a relatively large area of recording material.

The invention itself, however, both as to its organization and method of operation, together with other objects and features thereof, may be best understood from the following description of an exemplary system embodying the invention when said description is read with reference to the accompanying drawings, in which.

Figures 1, 4:
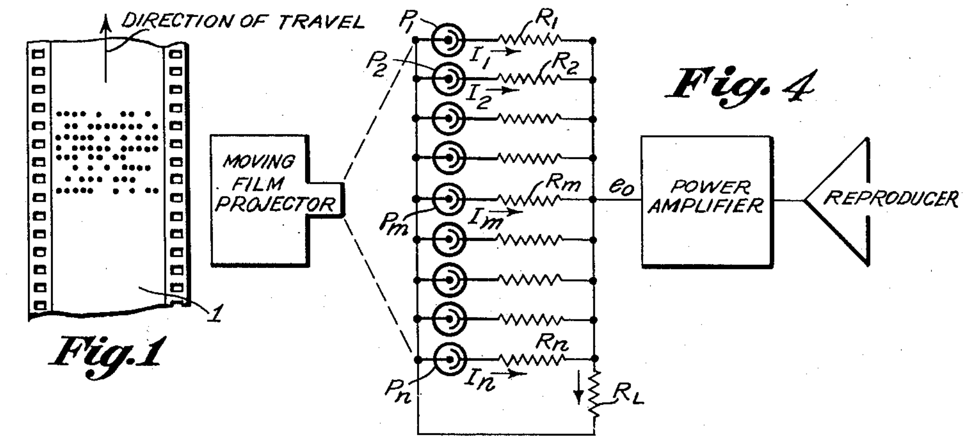
Figure 1 is a top plan view of a piece of film having code groups printed thereon in accordance with the present invention.
Figure 4 is a diagrammatic showing of a light sensitive screen for reproducing a recorded signal and illustrating more particularly a method of combining the output of a plurality of light sensitive elements, such as phototubes.

An illustrative embodiment which is to be considered as a specific example of an inventive concept which is limited only by the appended claims, is shown in the drawings. The invention is shown as applied to a novel method of recording because this is one of the important phases of the invention. However, the same system and apparatus could be utilized for the translating of signals into the coded system, which could be reconstructed in conversion apparatus to reproduce the original signal directly without recording.

Referring more particularly to Figure 1, numeral 1 denotes a fragmentary strip of film along transverse parallel lines on which are printed codes in the form of dots of any desired system, for example, a binary coding system. It will be readily apparent that the codes or dots are spread over substantially the entire area of the film and extend across the entire width. In reproducing the printed signal, inasmuch as the codes either appear or do not appear at predetermined assigned positions, there is provided a strictly on-off recording process, hence small variations in the placement of the codes on the record and inherent distortions of the film or other recording medium become of no consequence, thereby providing faithful reproduction of a given signal.

A further advantage in utilizing the total area of the recording substance will become manifest in the decreased speed at which the film or other record must move, or consequently the smaller length of record which is required for a given time of recorded signal.

Figure 3:
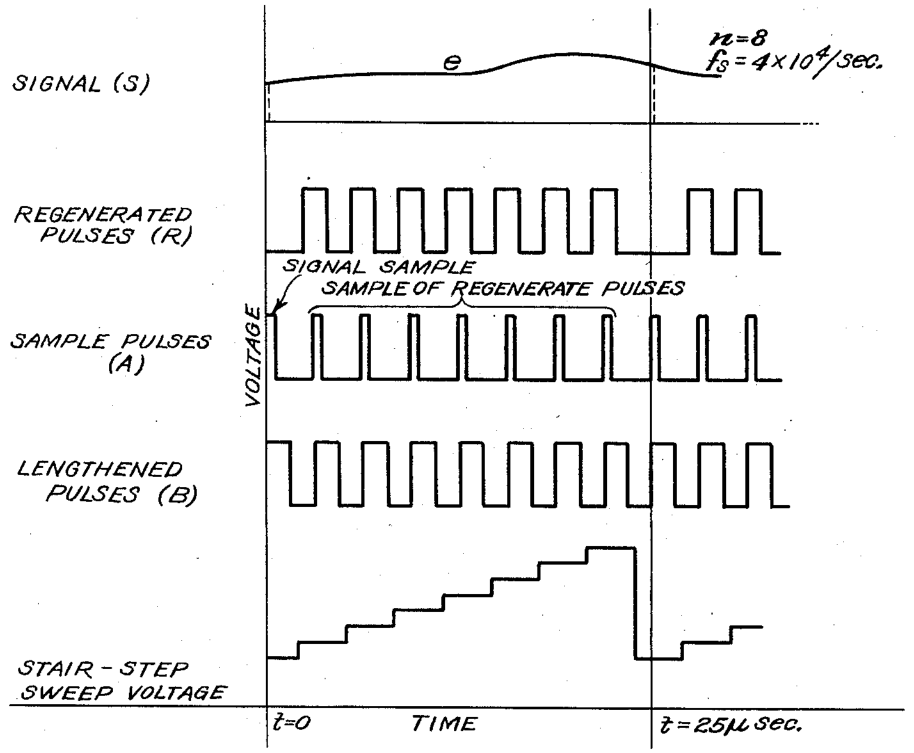
Figure 3 shows graphs of the various potential wave forms at various places in the recording system shown in Figure 2.
Figure 2:
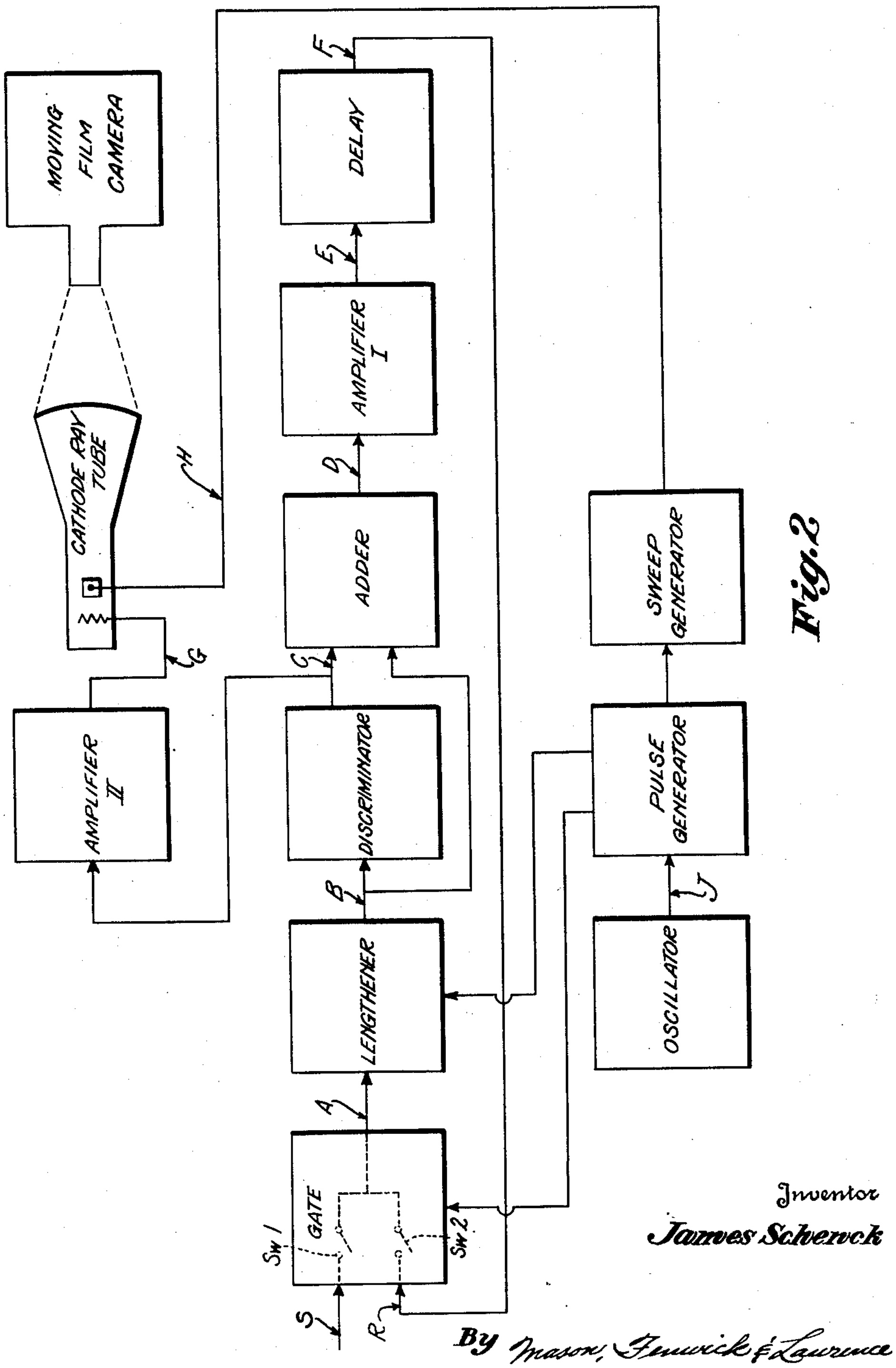
Figure 2 shows in diagrammatic form the various elements of an exemplary recording system embodying the present invention and illustrating the manner in which the various component elements cooperate with each other.

Figure 2 shows a schematic diagram of a complete electrical system for code recording or reproduction embodying the principles of the present invention. Referring to both Figures 2 and 3, let $f_s$ be the sampling rate, it being understood that a sample is a substantially instantaneous measurement of the amplitude of the signal $e$ shown in Figure 3. The term "amplitude," as referred to hereinafter, denotes a magnitude of voltage. The recurrent rate at which the samples are taken will be referred to as the "sampling rate."

Let $n$ be the number of codes chosen to represent a sample of the amplitude of the signal $e$. A code is defined herein as the presence or absence of a discrete representation (such as a printed dot) at a specified time or place.

Let the range of the amplitude of the signal $e$ be such that $0<e<k\times 2^n$, where $k$ is a constant equal to the maximum amplitude to be expected in any pulse of the signal S, divided by $2^n$.

Switches $Sw_1$ and $Sw_2$ represent the mechanical equivalent of an electronic gate. $Sw_1$ when closed serves to sample the signal $e$ at S and $Sw_2$ when closed samples the amplitude of the regenerated pulses at R. The term "regenerated pulse" is used to designate a pulse which has been operated upon by the coder circuit, and which has been prepared for recirculation in the coder. The term "pulse" used hereinafter refers to a rectangular voltage pulse (Figure 3), that is, one wherein the voltage describes a rectangle when plotted on a time axis. When $Sw_1$ or $Sw_2$ closes, it is for a very short time $$(\ll\frac{1}{2nf_s}\text{ seconds})$$

A cycle begins, say at $t=0$, when $Sw_1$ closes, sampling $e$. A delayed regenerated pulse then appears at R, where it is sampled at $$t=\frac{1}{nf_s}\text{ second}$$

by closing $Sw_2$. Subsequently, another delayed regenerated pulse appears at R and is again sampled by closing $Sw_2$. Altogether, the sample taken of $e$ is circulated $n-1$ times, after which $Sw_1$ closes again, taking another sample of $e$ at $$t=\frac{1}{f_s}\text{ second}$$

which is again regenerated, and so on.

The purpose of the regenerating pulses is to produce at the output of amplifier II, at G, a train of pulses representing a binary number proportional to the sampled amplitude of $e$. Each of these pulses has a duration of $$\frac{1}{2nf_s}\text{ second}$$

is separated by intervals of $$\frac{1}{nf_s}\text{ second}$$

and has an amplitude of either 0 or V. Each pulse train consists of $n$ pulses occurring during succeeding intervals of $$\frac{1}{f_s}\text{ second}$$

In other words, there is a set of on-off pulses arranged in time sequence representing a binary code corresponding to every sampled amplitude value of $e$.

The sweep generator produces a synchronized "stair-step" deflection voltage H of $n$ steps for on pair of deflection plates of the cathode ray tube. Each step of the sweep is synchronized with a particular code pulse.

The cathode ray tube is operated in a conventional manner. The beam is focused to converge at a point on the fluorescent screen. The control grid is normally biased so that no beam current flows. The code pulses from the output of amplifier II operate on the control grid, and the amplitude V of these pulses is sufficient to permit beam current to flow for the duration of the pulse, thus producing a fluorescent spot on the screen.

Since there is a one-to-one correspondence of the steps of the sweep voltage to the code pulses of a pulse train for every sample of $e$, each pulse is assigned a fixed position on the cathode ray tube screen, and at that position either a fluorescent spot appears or does not, depending on whether the amplitude of that code pulse is V or 0, respectively.

In this way there is displayed on the cathode ray tube screen a single row of $n$ fluorescent spots. The arrangement of the spots, characterized by the presence or absence of certain spots at the specified points, identifies the particular sample of $e$ in the form of a definite code. The arrangement is in general different for each different sample of $e$. The spot arrangements change at a rate of $f_s$/second, corresponding to the sampling rate of the coder. The display of spots on the screen is photographed by a moving film camera in which the film moves at a constant speed sufficiently fast to resolve the changes in spot arrangement.

It will be obvious to persons skilled in the art that the use of a stairstep sweep is not essential. For instance, a "linear sweep" would be usable, however, it would have the disadvantage that the spot on the cathode ray tube would move while exposing the film, thereby causing some blurring of its image on the film after exposure. It will also be obvious that any submultiple of the sweep frequency may be used, the result being that not one but a plurality of code groups are printed in a line perpendicular to the direction of film travel. A schematic diagram of a suitable sweep circuit is incorporated in Figure 5 only in order to show more clearly the cooperation of such a circuit with the code recording system.

Reproduction of the original signal is accomplished, in the case where the record medium is photographic film, by means if a photo-electric device. In the simplest case where only one code-group is printed per line, an image of the film is projected and focused so that each code position coincides with a corresponding photo-cell. For instance, a ten code single channel system would require ten photo-cells. The film moves at a constant speed such that each code-group is sequentially detected by the photo-cells at the frequency of the original sampling rate. The outputs of the photo-cells are combined in such a manner that these combined outputs accurately reproduce the original signal.

Referring more particularly to Figure 4:

Let $m=1, 2 \ldots n$ represent the subscripts of the photo-cells $P_1$ to $P_n$ and the resistances $R_1$ to $R_n$ through which current from them flows. The voltage $e_0$, then, is the effect of the sum of all the currents $I_1$ to $I_n$ flowing through $R_1$. Then the values of the resistances $R_m$ are chosen so that $$e_0 \approx \sum_{m=1}^{n} 2^{n-m} \times F(P_m)$$

where $F(P_m)=0$ for light not falling on $P_m$ and
$F(P_m)=1$ for light falling on $P_m$ In the case where a line contains a large number of code-groups, the film object is projected and focused on the screen of a photo-electric storage device such as an iconoscope. The electron beam of the iconoscope scans the record image so that the output of the iconoscope is a continuous sequence of codes. This sequence of codes is synthesized into the representative code-groups which are in turn combined to reproduce the original signal. In the same case, the signal can be reproduced by an alternative method where the moving spot of a cathode ray tube is focused on the film and where the light transmited through the film is detected by a photo-electric cell. The fluorescent spot moves so that its image on the film record scans the codes in such sequence that the code signal at the output of the photoelectric cell can be combined to reproduce the original signal.

The way in which the electronic circuit of Figure 2 operates in order to produce the above described coding can be understood by considering a particular pulse $A_0$ at A, which produces at the same instant pulses $B_0$, $C_0$, $D_0$, $E_0$ and $F_0$ at B, C, D, E and F, respectively.

The lengthener generates a pulse $B_0$ whose leading edge and amplitude coincide with $A_0$, but whose duration is extended to $$\frac{1}{2nf_s} \text{ second}$$

The discriminator generates a pulse $C_0$ at the same time and for the same duration as $B_0$, but whose amplitude is such that for $$B_0 \leq k \times 2^{n-1}, \ C_0=0$$

and for $$B_0 > k \times 2^{n-1}, \ C_0=-k \times 2^{n-1}$$

The adder produces a pulse $D_0$ at the same time and for the same duration as $C_0$ but whose amplitude equals the sum of the amplitudes of $B_0$ and $C_0$. Amplifier I has a gain of two, so that the pulse $E_0$ corresponds to $D_0$ in time and duration but is of twice the amplitude of $D_0$. The delayed pulse $F_0$ is of the same amplitude and duration as $E_0$, but is delayed in time by $$\frac{3}{4nf_s} \text{ second}$$

This delay time of $$\frac{3}{4nf_s} \text{ second}$$

is so chosen that the delayed regenerated pulse may be sampled at its midpoint at $$t=\frac{1}{nf_s} \text{ second}$$

this being effective to achieve sampling at the midpoint of the regenerated pulses as each of the pulses has a duration of $$\frac{1}{2nf_s}$$

and are separated by intervals of $$\frac{1}{nf_s} \text{ second}$$

This is done because the leading and trailing edge of the delayed pulse will generally become distorted in its passage through the delay network, and sampling of the pulse midway between its leading and trailing edge most successfully avoids the effects of this distortion. $F_0$ enters the gate at R where its amplitude is sampled by $$Sw_2 \frac{1}{nf_s} \text{ second}$$

after $A_0$ was generated. The purpose of sampling and lengthening the regenerated pulses is to eliminate cumulative pulse shape distortion as the pulse is regenerated for $n$ times in the circuit. Amplifier II has a gain of $$\frac{V}{k \times 2^{n-1}}$$

so that the pulse $G_0$ at G occurs at the same time and is of the same duration as $E_0$, but is of amplitude V or 0.

The system described above performs as a "single channel" coder, that is, each lateral line of $n$ dots on the film is a single code-group representing one sample (discrete point on time function) of $e$. A minor change in the circuits will convert the system to a "multi-channel" coder, the result being that not only one, but many code-groups can be printed in sequence in a single row. The only change that is required is that the sweep generator produce the recurrent stairstep waveform at a sub-multiple lower rate while maintaining the same step length and thereby providing a multiple higher number of steps per cycle. Call this multiple $p$, then $p \times n$ dots will be printed on one line representing $p$ samples of $e$.

Figure 5:
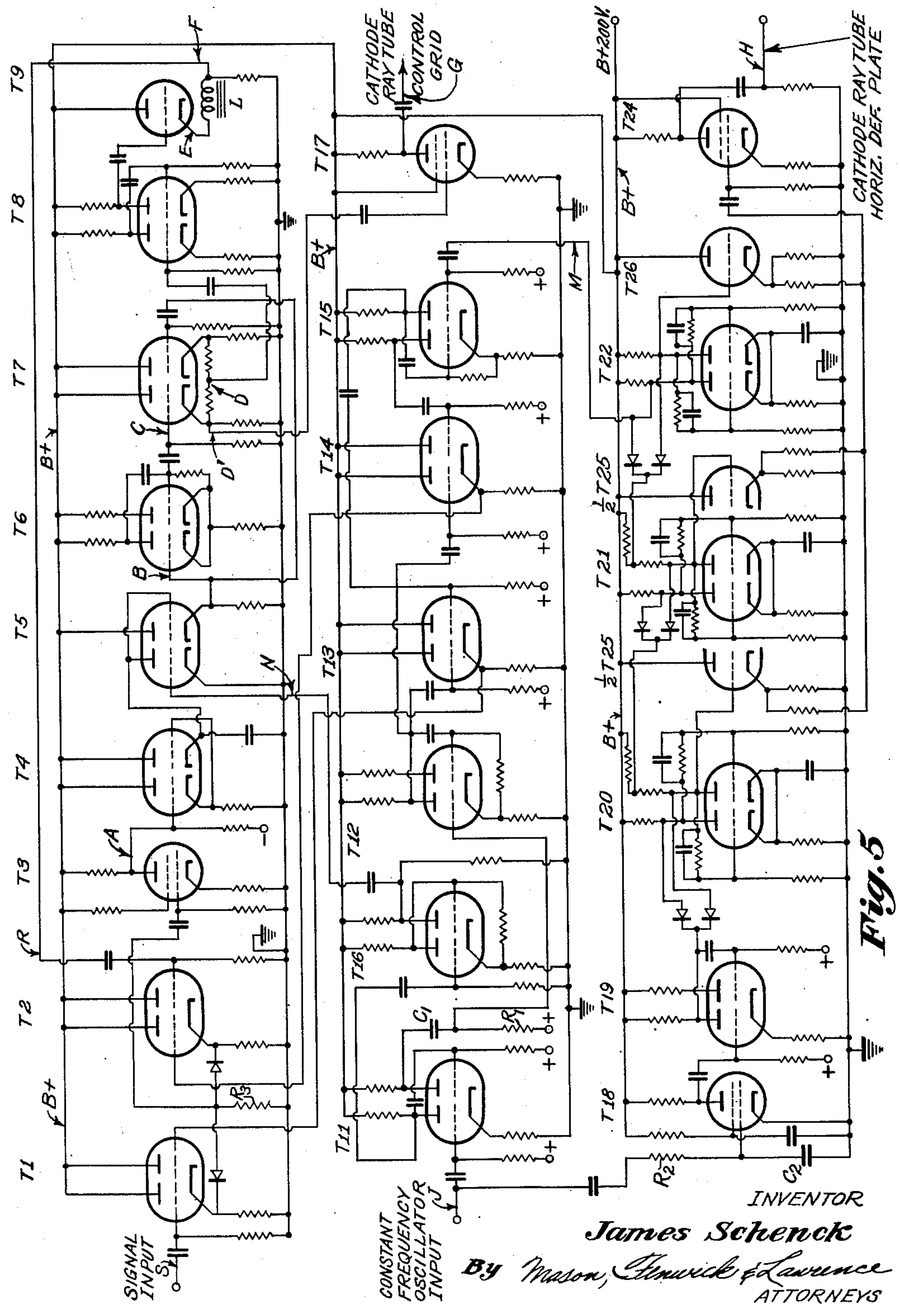
Figure 5 is a schematic circuit diagram of a coding apparatus and recording system embodying the principles of the present invention.

Figure 5 shows a complete circuit diagram of a single channel code system for film recording involving the component parts illustrated in block diagram in Fig. 2. With reference to the hereinbefore described general principles of operation, let it be assumed than $n=8$ ($n$ being the number of codes chosen to represent a sample of the amplitude of the signal $e$) and the sampling rate $f_s=4 \times 10^4$/second and $k=1$.

Constant frequency oscillations of $nf_s$/second or $3.2 \times 10^5$/second, such as may be produced in the output of conventional crystal controlled oscillators and the like, are applied at J to the input of overdriven amplifier $T_{11}$, clipping the sinusoidal output of the oscillator to produce square waves. This square wave formed at the output of overdriven amplifier $T_{11}$ is coupled through a differentiating circuit comprising resistor $R_1$ and condenser $C_1$ to form peaked pulses coincident with the leading edges of the square waveform. The positive differentiated pulses coupled from the differentiating circuit $R_1C_1$ are applied to the input of a univibrator $T_{12}$, producing ½ micro-second width pulses which are coupled to coincidence circuits of tubes $T_{13}$ and $T_{14}$. The term "univibrator" is used to designate a triggered square-waved generator of the one-shot cathode coupled multivibrator or similar type, operative to produce a single pulse of a selected duration determined by the values of the circuit components for each trigger pulse coupled to the input.

The oscillations at J are also coupled to a ninety degree phase shift network comprising resistor $R_2$ and condenser $C_2$, whence the phase shifted oscillations are coupled through an amplifier $T_{18}$, and an overdriven amplifier $T_{19}$ to clip the sinusoidal phase shifted waveform and produce a square wave output. The square waves generated in the output of the overdriven amplifier $T_{19}$ are applied to cascaded scaling circuits made up of tubes $T_{20}$, $T_{21}$ and $T_{22}$ and isolating cathode followers $T_{25}$ and $T_{26}$, to produce a stairstep sweep voltage in the output of amplifier $T_{24}$ intercoupled through the cathode follower amplifiers $T_{25}$ and $T_{26}$ from the tubes $T_{20}$, $T_{21}$ and $T_{22}$ of the cascaded scaling circuits. The stairstep sweep voltage at H is to be applied to the horizontal deflection plates of a conventional electrostatic cathode ray tube (not shown) to provide a horizontal sweep on the face of the cathode ray tube having a plurality of discrete accurately positioned locations horizontally along the face of the tube corresponding with the leading edge of each of the stairsteps in the sweep voltage waveform.

Pulses M corresponding with the leading edge of the stairstep deflection voltage waveform H are likewise coupled from the output of tube $T_{22}$ in the cascaded scaling circuits to a univibrator $T_{15}$, triggering the univibrator to produce pulses of 3 microseconds width which are coupled to the coincidence tube $T_{14}$ and pulses of 22 microseconds width coupled to the coincidence tube $T_{13}$. The coincidence tubes $T_{14}$ and $T_{13}$ respectively being intercoupled with switch gating tubes $T_2$ and $T_1$ controlling the coupling of the regenerated pulses R and the signal input S respectively to the system.

It will be apparent, therefore, that on absence of the 22 microsecond pulse produced by univibrator $T_{15}$ coincident with the ½ microsecond pulse produced by univibrator $T_{12}$ in the coincidence tube $T_{13}$, a ½ microsecond gating pulse is applied to the sweep tube $T_1$ coupled to the signal input S to bias the tube $T_1$ for ½ microsecond to be responsive to the input signal S, producing a current in the resistor $R_3$ coupled to the cathodes of $T_1$ and $T_2$ through rectifiers X proportional to the voltage amplitude of the input signal after every interval of 25 microseconds. In this way, the input signal S is sampled through the switch tube $T_1$ at a rate of $4\times10^4$/second.

The pulse voltage across the resistor $R_3$ coupled to the cathodes of the switch tubes $T_1$ and $T_2$, is coupled through an inverter circuit comprising tube $T_3$ and lengthener circuits comprising tubes $T_4$ and $T_5$. Pulses N generated in the output of a univibrator $T_{16}$ triggered by the square wave output of overdriven amplifier $T_{11}$, are coupled to the lengthener tube $T_5$ and determine the duration of the lengthened pulses.

The lengthened pulses at B at the output of the lengthener tube $T_5$ are coupled to the discriminator tube $T_6$, the operation of which was described hereinabove in reference to Figure 2. The discriminator tube $T_6$ is coupled to form a univibrator, so biased that for the condition $e>128$ volts, a negative pulse is produced, which is coupled at C to the input of tube $T_7$ arranged to form an adder circuit. The tube $T_7$ is a duotriode having a resistor intercoupled across the top of cathode follower resistors in the cathode circuit of each half of the tube $T_7$, the discriminator output pulse C being intercoupled to one grid of tube $T_7$ and the positive pulse from B being coupled to the other grid of $T_7$. The discriminator $T_6$ is so biased and the negative pulse generated thereby is such that for the condition $B>K2^{n-1}$, or $e>128$ volts, the pulse D at the centertap of the cathode bridging resistor constituting the output of the adder circuit of $T_7$ is equal to $2(B-K2^{n-1})$ and for the condition $B\leqq K2^{n-1}$, D is equal to 2B. A pulse is likewise coupled at D′ from one side of the adder circuit at $T_7$ through an amplifier $T_{17}$, to produce an unblanking pulse G coupled to the control grid of the cathode ray tube to which the stairstep voltage H is applied. The pulse G, for the condition $B>K2^{n-1}$ is of a fixed amplitude V, while for the condition $B\leqq K2^{n-1}$, the amplitude of the pulse G is zero. The pulse thus produced at the output D of the adder circuit at tube $T_7$ is coupled through amplifiers $T_8$ and $T_9$, the cathode circuit of $T_9$ having a delay network L therein operative to delay the pulse E at the cathode of $$T_9\frac{3}{4nf_s}\text{ seconds}$$

the delayed pulse F being intercoupled to the input of switch tube $T_2$ at R.

During non-coincidence of the 3 microsecond pulses coupled from univibrator $T_{15}$ and the ½ microsecond pulses coupled from univibrator $T_{12}$ in the coincidence tube $T_{14}$, a ½ microsecond gating pulse is applied to the switch tube $T_2$, biasing the tube $T_2$ to be responsive to the delayed regenerated pulses R to produce a current flow through the resistor $R_3$ for ½ microsecond proportional to the voltage amplitude of the regenerated pulses R. These ½ microsecond gating pulses coupled to the switch tube $T_2$ occur every 3.13 microseconds except during the interval when switch tube $T_1$ is biased to respond to the input signal S, the coincidence tube $T_{13}$ controlling switch tube $T_1$ being disabled during the 22 microsecond period when the pulse from tube $T_{15}$ is applied thereto to gate the tube $T_1$ with the ½ microsecond pulses from $T_{12}$.

It will be apparent that the frequency and number of codes can be changed very simply for optimum results for different types of signals. For example, records of speech require lower frequency sampling rates and fewer codes.

The method involving the present invention is particularly adaptable to recording on photographic film since such medium at the present time offers the highest resolution, that is, it is capable of storing a considerable amount of intelligence.

Thus it will be seen that I have provided a highly efficient, reliable and precise recording method and system for providing relatively high signal-to-noise reproduction and involving the use of codes placed at predetermined positions on the recording medium making their observation and detection simple and accurate; furthermore, the codes are characterized by either being on or off at a predetermined spot and thereby being unaffected by the properties of the recording medium, for example, changes of dimension of the record as the result of shrinkage or changes in speed of movement of the record; furthermore, the present code recording system provides maximum economy of record area by use of substantially the entire area of the film or other recording medium and requires lower film speeds and smaller lengths of film for a given record; also, no distortion is introduced in copies or duplicates made from the code record, that is to say, small variations in position or density of the dots or codes do not in any way affect the accuracy or the faithfulness of reproduction.

While I have illustrated and described a certain specific embodiment of my invention, it will be apparent that other modifications and changes may be made within the contemplation of my invention and within the scope of the following claims.

What is claimed is:

1. A system of coding a time variant electrical signal, which comprises means including electronic gate means for sampling the signal at recurrent time intervals, means for measuring said sampled signal and producing a train of regenerated pulses constituting a permutation code group corresponding to the amplitude of said sampled signal, means for producing a synchronized "stairstep" deflection voltage, each step of which is synchronized with said regenerated pulses, and means coupling said regenerated pulse train and said deflection voltage to a cathode ray tube for imaging said pulse train on a cathode ray screen in the form of transversely disposed segments of coded dots.

2. A system of coding and recording a time-variant electrical signal which comprises means for sampling the signal by measuring its amplitude at periodically recurring time intervals, means for regenerating the sampled signal a plurality of times at spaced time intervals for each sampled pulse and in the form of a train of square wave pulses representing a binary code corresponding to each sampled amplitude value of the signal, means for lengthening said square wave pulses, means for amplifying said square wave pulses, means, including an oscillator, pulse generator and sweep generator, for producing a synchronized "stairstep" deflection voltage with each step in synchronization with a particular code pulse, a cathode ray tube means coupling said pulses and said deflection voltage to said cathode ray tube for intensity modulating the beam thereof and imaging the coded signal on the screen thereof in parallel transverse linear groups of pulses, and means for periodically recording the signals appearing on the screen of said cathode ray tube.

3. A system of recording recited in the next previous claim wherein said last named means comprises a photographic camera having a light sensitive film strip moving longitudinally at a constant speed for periodically photographing the cathode ray screen image in a manner so that the code pulses appear as dots disposed along parallel lines transversely of the direction of travel of the film extending substantially over the entire area of the film.

4. Apparatus for recording a time-variant electrical signal which comprises means for regenerating said signal in the form of a plurality of pulses, means sampling said signal and said regenerated pulses at periodically recurring time intervals, means coupled therewith for transforming the sampled pulses into a predetermined number of codes in terms of a binary number system wherein each code represents the value of a different digit, an electrostatic cathode ray tube, means for generating a recurrent sweep deflection voltage synchronized with said regenerated pulses and for applying it to horizontal deflecting electrodes of said cathode ray tube, and means for amplifying said regenerated pulses and applying them to a control grid of said cathode ray tube, thereby imaging a coded signal on the screen of said cathode ray tube in a transverse line of spots.

5. Apparatus recited in the next previous claim together with a photographic camera having a longitudinally moving light-sensitive film strip on which is photographed said coded images appearing on said cathode ray screen at a frequency corresponding to the sampling rate of said signal, thereby producing a film strip having printed codes in the form of dots disposed along spaced parallel lines transversely of the film and its direction of movement.

6. A method of coding a time variant electrical signal which comprises periodically sampling the signal at a constant rate of frequency, measuring the instantaneous amplitude values of the signal samples, regenerating the signal sample periodically to produce a train of pulses constituting a permutation code group representing a binary number proportional to the amplitude of the signal sample, and imaging said permutation code groups of pulses in the form of transversely disposed segments of coded dots.

7. A method of coding a time variant electrical signal which comprises periodically sampling the voltage of said signal at a constant repetition rate, measuring the amplitude of each signal sample, regenerating the signal sample a plurality of times at spaced intervals during the period between each signal sample to produce a train of pulses representing a binary code corresponding to the amplitude value of the signal sample, and imaging the trains of pulses in the form of transversely disposed segments of coded dots.

8. A method of recording a time variant electrical signal which comprises periodically sampling the signal at a constant rate of frequency, measuring the instantaneous amplitude values of the signal samples, regenerating the signal sample periodically to produce a train of pulses constituting a permutation code group representing a binary number proportional to the amplitude of the signal sample, imaging said permutation code groups of pulses in the form of transversely disposed segments of coded dots, and photographically impressing the imaged pulse code groups on a moving recording medium in discrete segments along parallel axes lying transverse to the direction of movement of the medium at spaced intervals along the direction of movement thereof.

9. A method of recording a time variant electrical signal which comprises periodically sampling the voltage of said signal at a constant repetition rate, measuring the amplitude of each signal sample, regenerating the signal sample a plurality of times at spaced intervals during the period between each signal sample to produce a train of pulses representing a binary code corresponding to the amplitude value of the signal sample, means for imaging the trains of pulses in the form of transversely disposed segments of coded dots, and photographically impressing the imaged pulse code groups on a moving recording medium in discrete segments along parallel axes lying transverse to the direction of movement of the medium at spaced intervals along the direction of movement thereof.

10. A system of coding a time variant electrical signal, which comprises means for sampling the signal at recurrent time intervals, means for measuring said sample signal and producing a train of regenerated pulses constituting a permutation code group corresponding to the amplitude of said sample signal, and means for imaging said pulse train in the form of transversely disposed segments of coded dots.

11. A system of coding a time variant electrical signal which comprises means for sampling the signal at recurrent time intervals, means for measuring the sampled signal, means for regenerating the sample signal a plurality of times at spaced time intervals for each signal sample to produce a train of pulses, means for transforming the train of pulses for each signal sample into a coded pulse group representing a binary number proportional to the amplitude of the signal sample, and means for imaging said pulse code groups in the form of transversely disposed segments of coded dots.

12. A system of recording a time variant electrical signal, which comprises means for sampling the signal at recurrent time intervals, means for measuring said sampled signal and producing a train of regenerated pulses constituting a permutation code group corresponding to the amplitude of said sample signal, means for imaging said pulse train in the form of transversely disposed segments of coded dots, and means for photographically impressing the imaged pulse code groups on a moving recording medium in discrete segments along parallel axes lying transverse to the direction of movement of the medium at spaced intervals along the direction of movement thereof.

13. A system of recording a time variant electrical signal which comprises means for sampling the signal at recurrent time intervals, means for measuring the sampled signal, means for regenerating the sampled signal a plurality of times at spaced time intervals for each signal sample to produce a train of pulses, means for transforming the train of pulses for each signal sample into a coded pulse group representing a binary number proportional to the amplitude of the signal sample, means for imaging said pulse code groups in the form of transversely disposed segments of coded dots, and means for photographically impressing the imaged pulse code groups on a moving recording medium in discrete segments along parallel axes lying transverse to the direction of movement of the medium at spaced intervals along the direction of movement thereof.

References Cited in the file of this patent

UNITED STATES PATENTS

| Number | Name | Date |
|---|---|---|
| 2,186,268 | Pakala | Jan. 9, 1940 |
| 2,275,017 | McNaney | Mar. 3, 1942 |
| 2,367,042 | Nieswinter | Jan. 9, 1945 |
| 2,451,044 | Pierce | Oct. 12, 1948 |
| 2,453,454 | Norwine | Nov. 9, 1948 |
| 2,474,266 | Lyons | June 28, 1949 |
| 2,477,848 | Broek et al. | Aug. 2, 1949 |
| 2,489,253 | Andre | Nov. 29, 1949 |
| 2,510,121 | Lehmann et al. | June 6, 1950 |
| 2,518,022 | Keister | Aug. 8, 1950 |
| 2,531,600 | Barney et al. | Nov. 28, 1950 |
| 2,596,741 | Tyler et al. | May 13, 1952 |

OTHER REFERENCES

Visual Presentation of Binary Numbers (Electronic Engr., vol. 33, Mr. 278, Apr., 1951).